United States Patent
Klanke

[15] 3,677,580
[45] July 18, 1972

[54] ADJUSTABLE PIPE COUPLING

[72] Inventor: Charles E. Klanke, 1416 Luke Lane, Indianapolis, Ind. 46227

[22] Filed: April 7, 1970

[21] Appl. No.: 26,303

[52] U.S. Cl..............................285/184, 285/22, 285/276, 285/286
[51] Int. Cl...........................................................F16l 13/04
[58] Field of Search....................285/22, 21, 286, 276, 282, 285/277, 223, 184, 289, 290, 114; 29/482, 483

[56] References Cited

UNITED STATES PATENTS

| | | | |
|---|---|---|---|
| 2,037,962 | 4/1936 | Brown | 285/22 |
| 3,314,694 | 4/1967 | Faccou | 285/276 X |
| 2,910,310 | 10/1959 | Mulac | 285/282 X |
| 2,696,264 | 12/1954 | Colmerauer et al. | 285/276 X |
| 1,872,271 | 8/1932 | Furrer | 285/22 |
| 2,878,040 | 3/1959 | Hobbs | 285/286 |
| 3,037,799 | 6/1962 | Mulac | 285/282 |

FOREIGN PATENTS OR APPLICATIONS

| | | | |
|---|---|---|---|
| 716,470 | 8/1965 | Canada | 285/276 |
| 553,388 | 6/1932 | Germany | 285/276 |
| 1,481,523 | 4/1967 | France | 285/277 |

*Primary Examiner*—Thomas F. Callaghan
*Attorney*—Harold B. Hood

[57] ABSTRACT

A pair of cooperative pipe sections have telescopic male and female ends. Bearing means is supported by the end of one of said sections, the other of said sections having groove means therein receiving said bearing means to enable rotation of the sections with respect to one another but preventing separation thereof in a longitudinal direction. The two sections are provided with cooperative adjacent weld bevels to enable the sections to be rigidly welded to one another.

The first form of the invention permits rotation of one section with respect to another through an angle of 360°. A second form of the invention permits extension of one section with respect to another in a longitudinal direction, and a third form of the invention enables one section to be slanted at an angle with respect to the adjacent section. These different forms of the invention may be combined in various combinations.

6 Claims, 12 Drawing Figures

Patented July 18, 1972  3,677,580

INVENTOR
CHARLES E. KLANKE

BY Imirie, Smiley, Snyder & Butrum

ATTORNEY

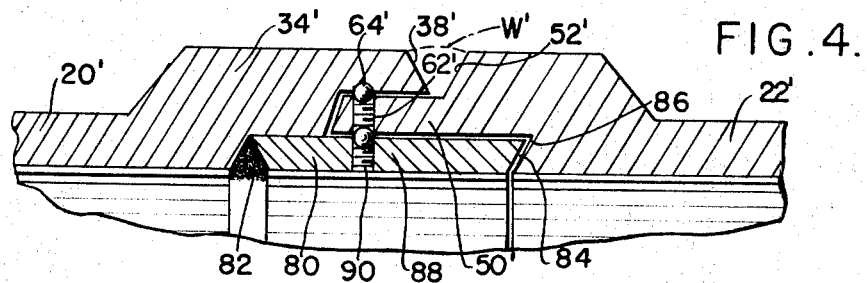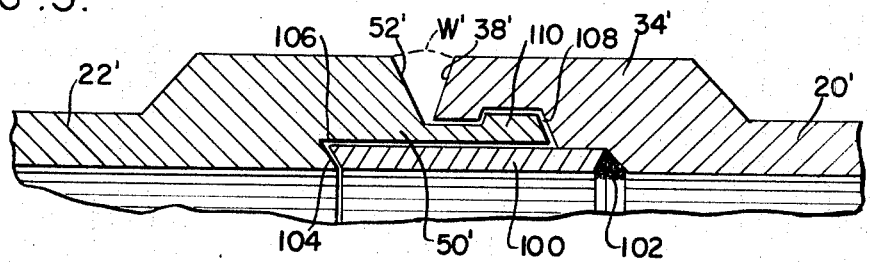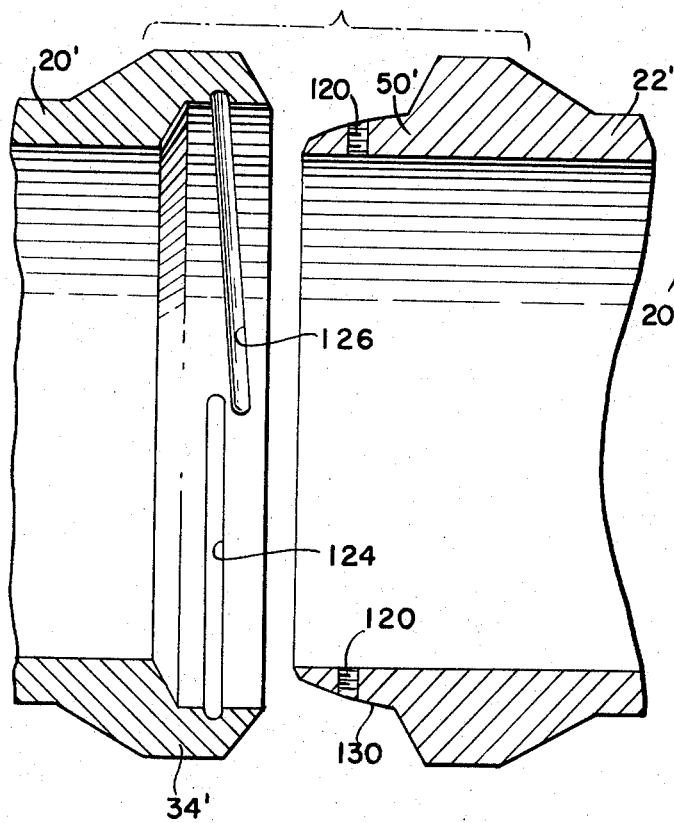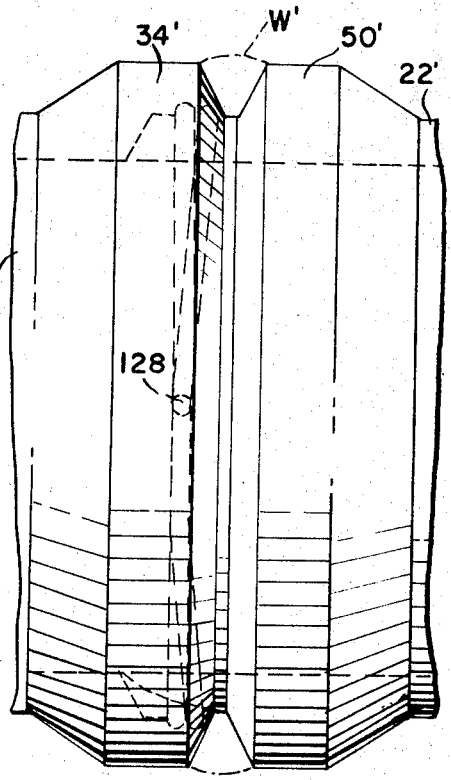
INVENTOR
CHARLES E. KLANKE
ATTORNEY

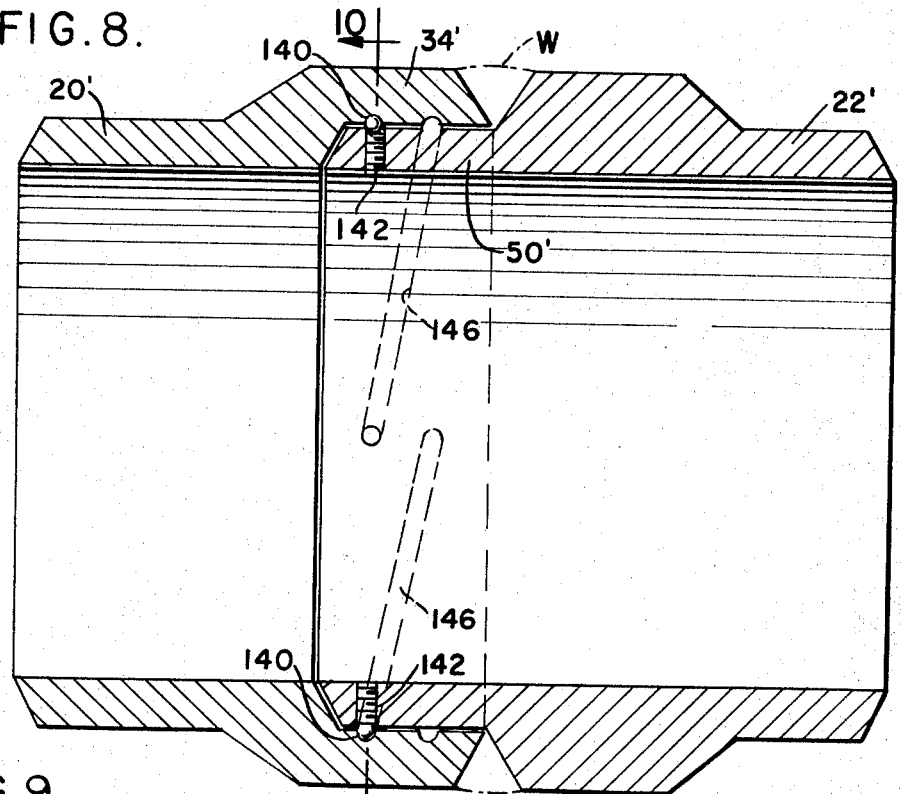
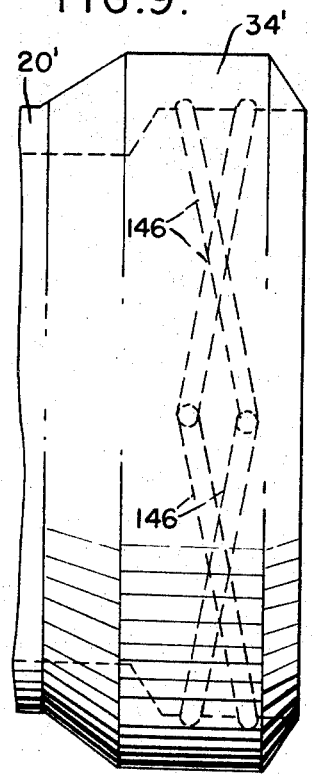
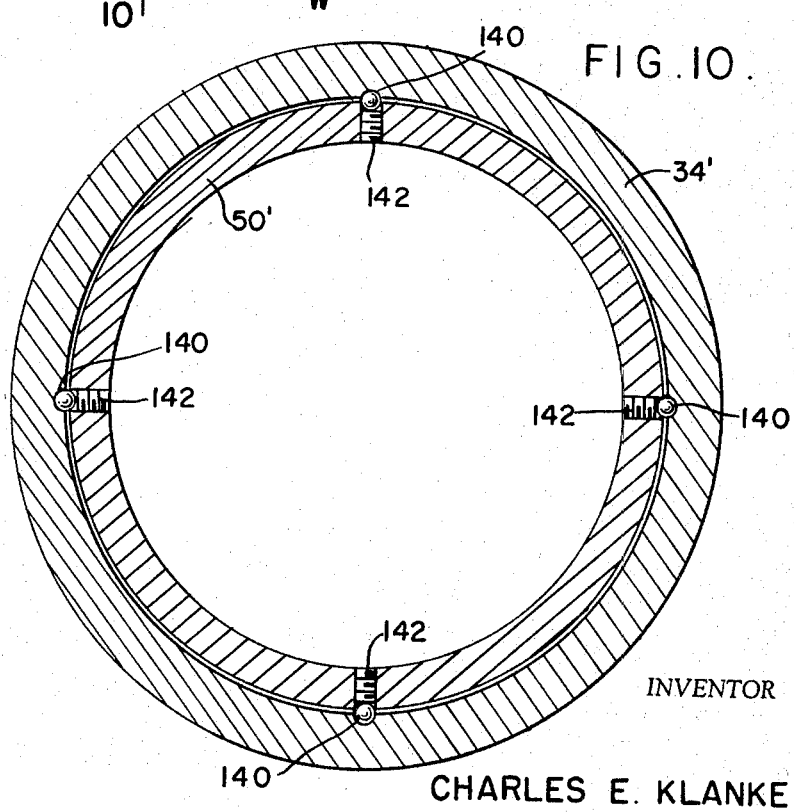
INVENTOR
CHARLES E. KLANKE
BY
ATTORNEY

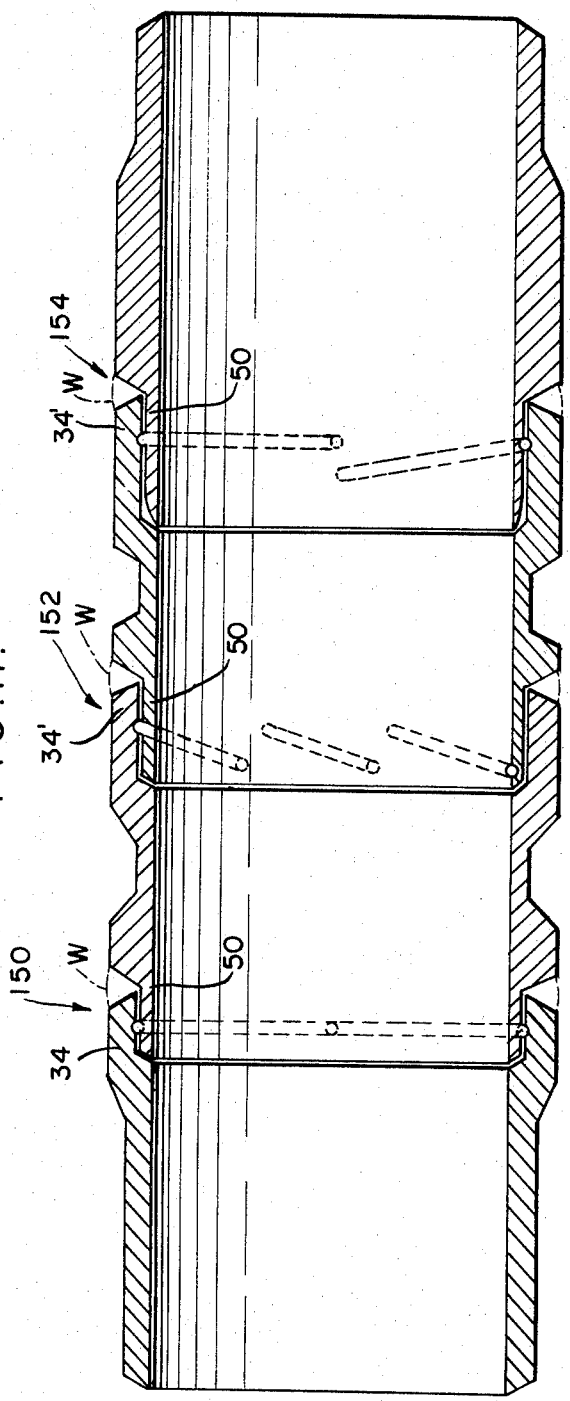
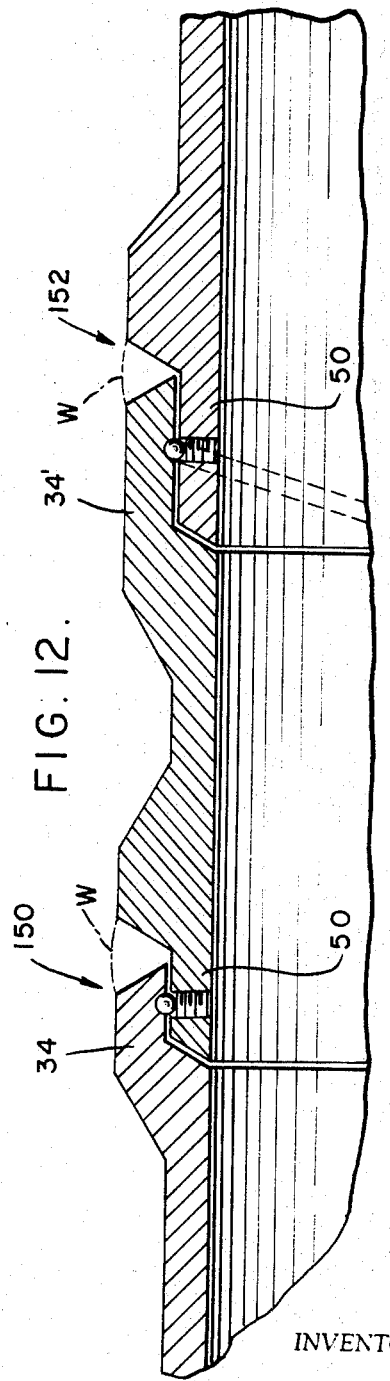
INVENTOR
CHARLES E. KLANKE

ADJUSTABLE PIPE COUPLING

BACKGROUND OF THE INVENTION

The present invention relates to an adjustable pipe coupling which is particularly useful for laying pipe in the field wherein adjacent pipe sections are rigidly welded to one another.

Such welded pipe is employed for conveying liquids and gases or the like over large distances. Oil, gas, grain, coal and many other products are conveyed from one point to another through pipe lines of this type. Pipe and tubing of ferrous and non-ferrous materials or various other combinations which are welded in place have been used in the construction of this type of pipe line.

As pipe of this type is being laid, it is often necessary to fabricate joints when the pipe changes direction either in a horizontal or a vertical direction due to natural obstructions and the like. It is, of course, desirable to properly align the ends of the pipe sections to be joined in an accurate manner so that correct welding space is provided and so that a stress-free weld can be provided.

In the past, the pipe line has been prefabricated with the necessary angles therein, and often the angle and radius involved does not permit the use of standard fittings. One problem common to all pipe systems employing welded joints is the assembly, alignment and welding of a stress-free joint. This problem becomes acute where excessive stresses are applied to the pipe sections to bring them into proper alignment with one another. Such excessive stresses are incorporated in the pipe line and they eventually tend to cause failure of the line.

The fabrication of stress-free joints is very difficult under present construction procedures since there is no field adjustable connection presently available. This is a particular problem where a compound curve is required in a pipe line or where two rigidly secured sections of an existing pipe line which are not in alignment with one another must be welded together. In most cases, stress produced by forcing the pipe ends into alignment with one another is introduced into the joint at the weld thus creating dangerous forces that may later tend to cause rupture when the line is in operation.

The necessary angles for bends in a pipe line cannot always be accurately measured so that the pipe line can be prefabricated in an exact manner. When lines to be connected are misaligned, the angle of misalignment may only be 3°–6°, but the pipe sections must be forced into alignment. This problem of misalignment may be caused by poor craftsmanship in making prefabricated bends in the pipe, or by faulty boring or portions in the earth to receive the pipe. Rocks and other obstacles cause deflections in such boring causing misalignment of the pipe sections regardless of the accuracy of the bends which may be formed in the pipe line. Sometimes the scaffolding supporting the bends in the pipe line in alignment with one another become dislodged so that the alignment in the bends is changed thereby changing the angle required for the tie-in between adjacent pipe sections. The scaffolding may be dislodged because of run-off of water after a rain, or vibration caused by tractors, trucks and welding machines may cause misalignment. The pipe may also be damaged by contact with equipment or the bends formed in the pipe line may be rolled in the cradleing process.

When such misalignment is present, the ends of the adjacent pipe sections may either be forced into alignment with one another, or the bend that is causing the misalignment may be cut out and replaced. The most common procedure is simply to force the ends of the adjacent sections into alignment with one another and then weld them in place. This, of course, produces stresses in the welded joint which are undesirable.

Tractors are generally employed for pulling the sections into proper alignment with one another, and after the weld is completed, the tractor is disconnected the the stresses are then commonly concentrated in the welded joint. Additionally, when such misaligned pipe sections are connected, they are generally connected by clamps, and wedges are driven between the pipe and the clamps with sledge hammers to produce the final adjustment, thereby inducing additional stresses in the pipe sections. All of these stresses produced in the pipe sections are transferred to the weld joint when the pipe sections are subsequently released.

It is accordingly desirable to provide a field connection between adjacent pipe sections which can be adjusted to compensate for misalignment of pipe sections prior to rigidly welding the pipe sections to one another.

SUMMARY OF THE INVENTION

In the present invention, a pair of cooperative pipe sections have telescopic male and female ends. Bearing means is supported by the end of one of said sections and is received within groove means provided in the end of the other of said sections. The groove means may be arranged in several different manners according to the present invention. In a first form of the invention, the groove means permits a rotation of one pipe section through an angle of 360° with respect to the other pipe section without varying the longitudinal or angular relationship of the two sections.

In a second form of the invention, the groove means is so arranged that the angular relationship between the adjacent sections can be varied. In a third form of the invention, the groove means is so arranged that the two sections can be displaced longitudinally with respect to one another.

In each form of the invention, the cooperative bearing means and bearing receiving means enables rotation of the sections with respect to one another while preventing complete separation thereof in a longitudinal direction.

The adjustable pipe coupling of the present invention enables the relative position of the ends of two pipe sections to be adjusted with respect to one another prior to welding. This enables the fabrication of pipe lines including relationships between pipe sections which cannot be obtained with standard fittings or bends. The connection can be made without the use of excessive outside forces applied by tractors, winch lines, jacks, hammered wedges and the like. This enables stress-free connections to be made between adjacent pipe sections. The coupling is adjustable to field conditions and provides a finished welded construction that can be incorporated as an integral unit meeting all legal requirements.

The present invention enables two pipe sections to be welded together wherein it is necessary to adjust the pipe sections with respect to one another prior to welding so that excessive outside forces are not required and to provide a connection that can be permanently welded as a full functioning stress-free unit of a pipe line system.

No special equipment is required to install the coupling of the present invention and it requires no more maintenance, testing or inspection than any other tie-in weld. It can be doped and wrapped by hand as are conventional tie-in welds.

The relative dimensions of the various parts will, of course, be governed by the weld joint efficiency, bursting pressure, ultimate tensile strength, coefficient of friction in relation to rotation, the number and size of ball bearings required and the like. These design considerations will be apparent to one skilled in the art.

The bearing means of the present invention facilitates rotation of the two pipe sections with respect to one another and serves the additional function of preventing the two pipe sections from being separated from one another in a longitudinal direction. Preferably, a minimum number of bearings are employed and are spaced circumferentially about the pipe sections.

The relative rotation of the pipe sections enables angles or fittings to be placed in exact position in the field without having to apply external force. Once the coupling is rotated to the desired position and welded in place, an integral weld unit is provided that will carry the necessary pressure.

Additionally, the completed coupling is smooth on the inside thereof, and any angle of radius which is formed is large enough to insure unrestricted movement of pigs, squeeges, scrapers and sizing discs.

BRIEF DESCRIPTION OF THE DRAWINGS

FIG. 4 is a longitudinal section through still another form of the invention;

FIG. 5 is a longitudinal section through yet another form of the invention;

FIG. 6 is an exploded longitudinal section through still another form of the invention;

FIG. 7 is a top view illustrating the structure shown in FIG. 6 in assembled relationship;

FIG. 8 is a longitudinal section through a still further modification of the invention;

FIG. 9 is an elevation of the structure shown in FIG. 8;

FIG. 10 is a sectional view taken substantially along line 10—10 of FIG. 8 looking in the direction of the arrows;

FIG. 11 is a longitudinal section through a multi-purpose coupling according to the present invention; and, FIG. 12 is an enlarged view of a portion of the structure shown in FIG. 11.

DESCRIPTION OF THE PREFERRED EMBODIMENTS

Figure 1:
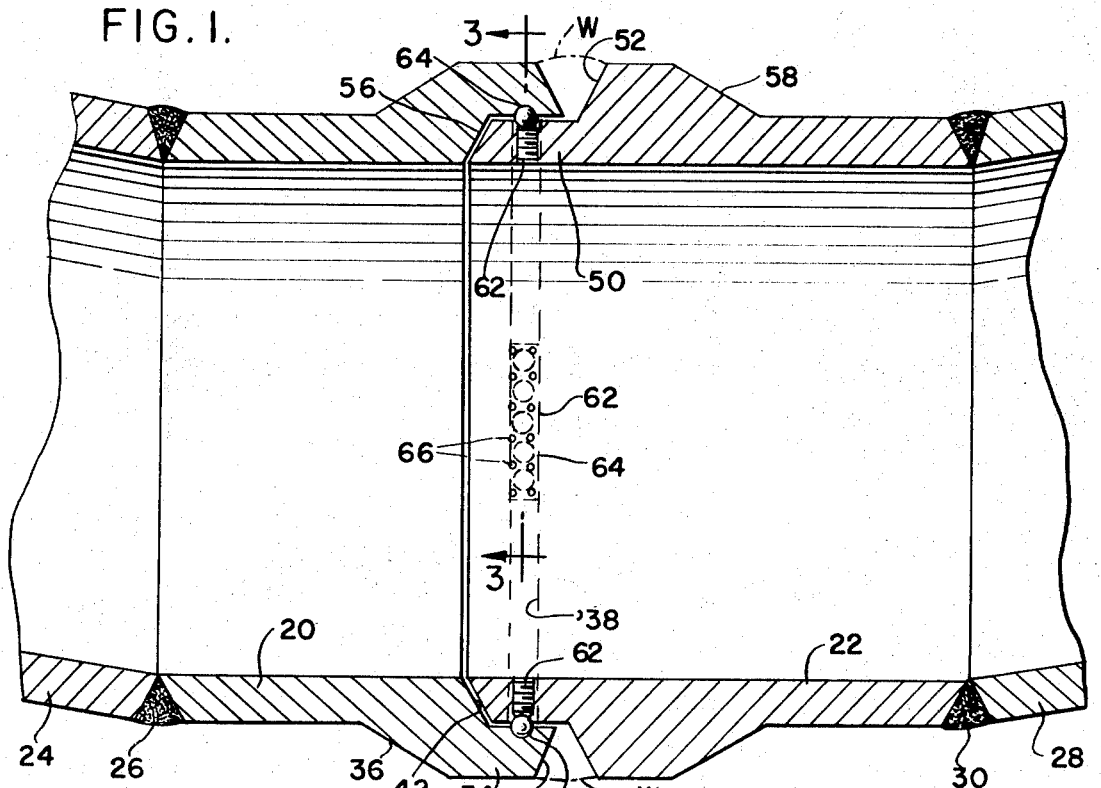
FIG. 1 is a longitudinal section through the first form of the invention.
Figure 3:
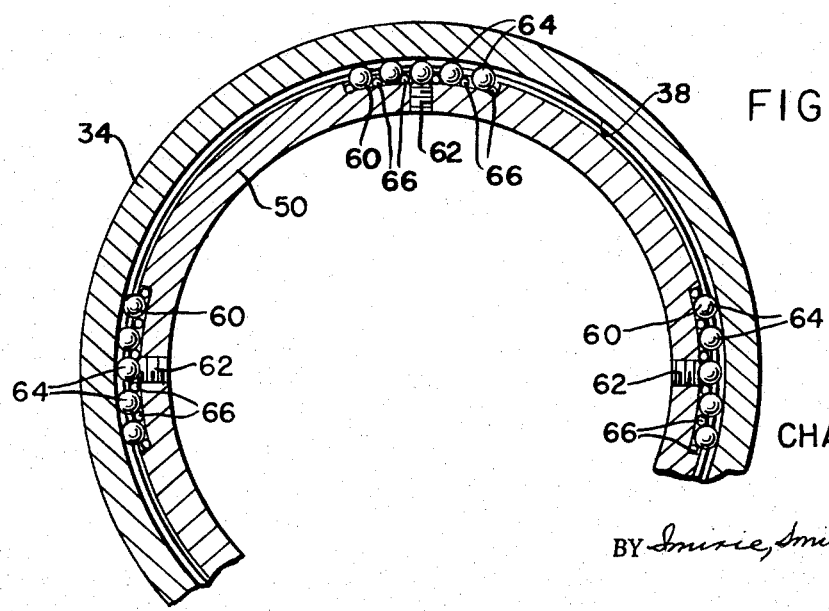
FIG. 3 is a sectional view taken substantially along the line 3—3 of FIG. 1 looking in the direction of the arrows.

Referring now to the drawings wherein like reference characters designate corresponding parts throughout the several views, a first form of the invention is shown in FIGS. 1 and 3 which permits relative rotation of a pair of pipe sections through an angle of 360° with respect to one another while maintaining axial alignment and preventing longitudinal displacement of the sections with respect to one another. A pair of cooperative pipe sections 20 and 22 are provided, section 20 being interconnected with a fitting or further pipe section 24 by a weld 26. In a similar manner, section 22 is connected with a fitting or a pipe section 28 by a weld 30.

Section 20 includes a female end 34 joining a beveled outer surface 36 which in turn joins with the outer surface of the remainder of the pipe section. The wall thickness of the female end is greater than the line wall thickness of section 20 and in a typical example may be of approximately 40 percent greater thickness. A weld bevel 38 is provided on the outer end of the female end portion 34.

A groove 38 extends circumferentially around the inner surface of female end 34 and is adapted to receive the bearing means hereinafter described. The inner surface of the female end 34 joins with a beveled shoulder 42. The beveled surfaces 38 and 42 each define an angle of approximately 30° with respect to a plane extending perpendicular to the longitudinal axis of the associated section.

Section 22 includes a male end 50 having a weld bevel shoulder 52 formed thereon. The male end also includes a tapered outer end 56 which is adjacent and complementary to the beveled surface 42 formed on section 20. These surfaces maintain the inner surfaces of the two sections substantially flush with one another. The male end includes a thickened portion having an outer surface of substantially the same diameter as the female end 34 of section 20, the thickened portion of the male end having a beveled surface 58 joining with the outer surface of the remaining portion of the associated section.

As seen most clearly in FIG. 3, the outer periphery of the male end 50 is provided with a plurality of circumferentially spaced bearing recesses 60 within which are disposed a plurality of ball bearings 64 fitting within the groove 38 formed in the surrounding female end of the other pipe section. As illustrated, 5 ball bearings 64 are disposed within each of recesses 60, and a plurality of smaller ball bearings 66 are interposed between ball bearings 64 in order to retain ball bearings 64 in spaced relationship and to enable free rotation of the two pipe sections with respect to one another. A pair of ball bearings 66 may be disposed between adjacent pairs of the larger ball bearings 64.

The ball bearings are inserted in operative position within the recesses 66 after the male and female ends of the associated sections have been moved into operative telescopic relationship through a radially extending hole provided in the male end 50 and in communication with the central part of each of recesses 60. After the balls have been inserted in operative position as illustrated, set screws 62 are threaded into said holes to hold the balls in operative position.

It is apparent that the construction shown in FIGS. 1 and 3 will permit relative rotation of the two pipe sections through an angle of 360° with respect to one another while preventing axial misalignment or relative longitudinal displacement of the sections.

Reference character W indicates the final weld which is formed between the welded bevels 38 and 52 formed on the two pipe sections. This weld is made after the two pipe sections have been suitably angularly adjusted with respect to one another. The weld provides a rigid finished pipe line construction.

Figure 2:
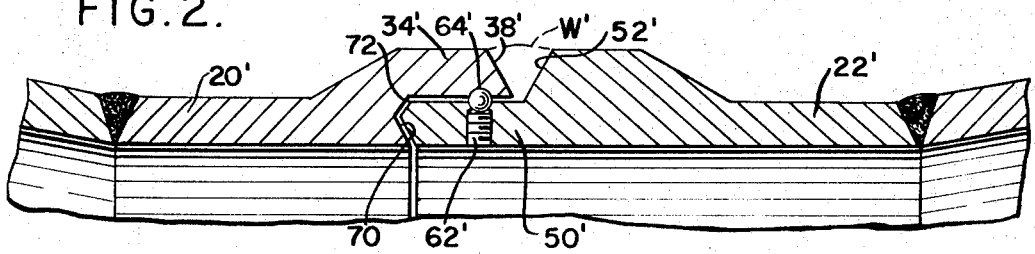
FIG. 2 is a longitudinal section through a modified form of the invention.

Referring now to FIG. 2, a modification of the invention is illustrated wherein similar parts have been given the same reference numerals primed. The only difference in this form of the invention is the provision of a double tapered recess 70 formed in the female end 34', while the end 72 of the male end 50' of the other pipe section is provided with a complementary double tapered end. This double tapered construction in effect provides a keeper angle that prevents the male end 50' from projecting toward the center of the pipe because of contraction due to welding. If there is no tendency for the male end to respond to welding in this manner, the construction shown in FIG. 1 may be employed.

Referring now to FIG. 4, a further modification of the invention is illustrated wherein parts similar to those shown in FIG. 1 have been given the same reference numerals primed. In this embodiment, an annular ring 80 is secured by a weld 82 to the female end 34'. The outer edge of ring 80 is beveled as indicated at 84 and is received within a correspondingly beveled recess 86 provided in the male end 50'.

In addition to the balls 64', a further concentric plurality of ball bearings 88 are supported within suitable recesses provided in the outer surface of ring 80, set screws 90 being provided for inserting the ball bearings into the associated recesses.

Referring now to FIG. 5, still another form of the invention is illustrated. In this embodiment, an annular ring 100 is secured by weld 102 to the female end 34'. The outer edge 104 of ring 100 is beveled and fits within a correspondingly beveled recess 106 formed in the male end 50'.

The female end defines an annular channel 108 of varying cross-section, and the male end includes an annular shoulder 110 of varying cross-section which is complementary to the shape of the annular channel. It is apparent that the construction illustrated will enable the two pipe sections 20' and 22' to rotate with respect to one another but will prevent relative longitudinal movement between the two sections. Sufficient clearances are provided in each of the forms of the invention so as to enable the desired degree of rotation to take place. As in all of the embodiments of the invention, the two pipe sections are rigidly welded together utilizing the weld bevels thereon once the two pipe sections have been adjusted with respect to one another.

Referring now to FIGS. 6 and 7, another modification of the invention is illustrated wherein similar parts have been given the same reference numerals primed. The male part of section 22' in this form of the invention is provided with two diammetrically opposite threaded holes 120 the outer end of each of which is dished to receive a single ball bearing. The female end 34' of section 20' is provided with a pair of grooves 124 and 126. Each of these grooves is formed on the inner periphery of the female end and extends through an arc of substantially 180°. Groove 124 lies in a plane disposed substantially perpendicular to the longitudinal axis of section 20'. Groove 126 on the other hand is disposed obliquely to the longitudinal axis of the associated section, the mid-point of this groove lying in the same plane as that in which groove 124 lies, the opposite ends of groove 126 being disposed closer to the open end of pipe section 20' than groove 124.

When the two pipe sections shown in FIG. 6 are disposed in assembled relationship as shown in FIG. 7, a ball 128 is illustrated as being disposed at the mid-point of groove 126 with the two pipe sections aligned with one another. Upon relative rotation of the pipe sections, ball 128 will move along groove 126 so as to cause the pipe sections to move into angular relationship with respect to one another. In this manner, a desired degree of angularity between the two pipe sections may be obtained. It is apparent that the amount of angular displacement between the two pipe sections is dependent upon the slope of groove 126 and the degree of relative rotation of the sections, and this slope can be varied as desired. Because the groove 126 inclines from its midpoint in both directions toward the right-hand end of the section, relative rotation of the sections in one direction from that midpoint will adjust angularity in one direction while relative rotation in the other direction will adjust angularity in the opposite direction.

Referring again to FIG. 6, it will be noted that the outer surface 130 of the male end of section 22' adjacent to threaded holes 120 is of arcuate cross-sectional configuration so as to provide clearance with respect to the inner surface of the female end 34' upon angular displacement of the two pipe sections with respect to one another.

Referring now to FIGS. 8–10 inclusive, still another form of the invention is illustrated. Similar parts have been given the same reference numerals primed. The male end 50' is provided with a plurality of holes shown as being four in number which have dished outer ends supporting ball bearings 140 held in place by set screws 142 threaded within the holes.

The inner surface of the female end 34' of the other pipe section is provided with a plurality of grooves 146 which are also four in number in the illustrated embodiment. These grooves lie in planes extending obliquely to the longitudinal axis of the associated section.

It is apparent that upon rotation of the two pipe sections with respect to one another, the pipe sections will be displaced longitudinally with respect to one another. No angular displacement will take place, and the two pipe sections are prevented from being completely separated.

Referring now to FIGS. 11 and 12, a multiple purpose adjustable coupling is illustrated combining various forms of the invention. A first coupling 150 similar to that shown in FIG. 1 is provided. A second coupling 152 similar to that shown in FIG. 8 is provided, and a third coupling 154 similar to that shown in FIG. 6 is illustrated. These three couplings 150, 152 and 154 enable various adjustments of the pipes with respect to one another. Coupling 150 enables the pipe sections to be rotated through an angle of 360° with respect to one another. Coupling 152 enables the pipe sections to be extended longitudinally with respect to one another, and coupling 154 enables the pipe sections to be angularly adjusted with respect to one another.

It should be understood that these various couplings can be widely spaced from one another by suitable lengths of pipe, and that the thickened wall portions are provided only adjacent the weld joints while the remaining portions of the pipe sections are of reduced wall thickness.

With a multi-purpose adjustable coupling as shown in FIGS. 11 and 12, and desired adjustment can be made between the various pipe sections to facilitate connecting of pipe sections in any conceiveable situation. Any suitable fitting can, of course, be connected between various ones of the couplings as desired. In most cases, it would not be necessary to provide more than one coupling 150, but there are situations where it may be desirable to include a plurality of couplings similar to coupling 152 or 154.

It is evident that various combinations of the couplings may be readily made since the couplings can be easily assembled and disassembled by placing the ball bearings in place or removing them as the case may be. The sequence of the couplings as shown in FIG. 11, may of course be rearranged and any one of the couplings may be eliminated so as to provide a different combination thereof. Additionally, the number of individual types of couplings may be varied as desired.

As this invention may be embodied in several forms without departing from the spirit or essential characteristics thereof, the present embodiment is therefore illustrative and not restrictive.

What is claimed is:

1. An adjustable pipe coupling comprising a pair of cooperative pipe sections having telescopic male and female ends, bearing means supported at each of two peripherally-spaced locations by the end of one of said sections, the end of the other of said sections having peripherally-extending bearing-receiving groove means, the portion of said groove means for receiving one of said bearing means lying in at least one plane which is oblique relative to the axis of said section, and the portion of said groove means for receiving the other of said bearing means lying in at least one plane which is differently angularly related to said axis whereby, upon turning movement of one of said sections about its own axis relative to the other section, the angular relation between the axes of said sections will be adjusted.

2. The coupling of claim 1 in which the last-mentioned portion of said groove means lies in a plane perpendicular to said section axis.

3. The coupling of claim 2 in which said first-mentioned portion of said groove means lies at its mid-point in said perpendicular plane and inclines oppositely therefrom toward the adjacent end of said section.

4. In a pipeline, a first coupling constructed in accordance with claim 1, and a second coupling cooperatively adjacent said first coupling comprising a pair of cooperative pipe sections having telescopic male and female ends, a plurality of ball bearings spaced circumferentially about the end of one of said sections, the end of the other of said sections having groove means receiving said ball bearings and lying in a plane substantially perpendicular to the axis of the associated section.

5. In a pipeline, a first coupling constructed in accordance with claim 1, and a second coupling cooperatively adjacent said first coupling and comprising a pair of cooperative pipe sections having telescopic male and female ends, a plurality of ball bearings spaced circumferentially about the end of one of said sections, the end of the other of said sections having groove means receiving said ball bearings and comprising a plurality of separate grooves, each of which is disposed in a plane extending obliquely at a common angle to the axis of the associated section.

6. In a pipeline, a first coupling constructed in accordance with claim 1, a second coupling cooperatively adjacent said first coupling and comprising a pair of cooperative pipe sections having telescopic male and female ends, a plurality of ball bearings spaced circumferentially about the end of one of said sections, the end of the other of said sections having groove means receiving said ball bearings and lying in a plane substantially perpendicular to the axis of the associated section, and a third coupling cooperatively adjacent said first and second couplings and comprising a pair of cooperative pipe sections having telescopic male and female ends, a plurality of ball bearings spaced circumferentially about the end of one of said sections, the end of the other of said sections having groove means receiving said ball bearings and comprising a plurality of separate grooves, each of which is disposed in a plane extending obliquely at a common angle to the axis of the associated section.

* * * * *